United States Patent
Choi et al.

(10) Patent No.: US 7,532,598 B2
(45) Date of Patent: May 12, 2009

(54) FLOODING METHOD IN AD-HOC NETWORK

(75) Inventors: Soon-jin Choi, Seongnam-si (KR); Il-whan Kim, Incheon (KR); Chung-gu Kang, Seoul (KR); Min-seop Jeong, Seoul (KR); Yu-jin Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 603 days.

(21) Appl. No.: 11/214,732

(22) Filed: Aug. 31, 2005

(65) Prior Publication Data

US 2006/0045066 A1  Mar. 2, 2006

(30) Foreign Application Priority Data

Aug. 31, 2004  (KR) .................. 10-2004-0068838

(51) Int. Cl.
    *H04W 4/00* (2006.01)
(52) U.S. Cl. ..................... 370/332; 370/338
(58) Field of Classification Search .......... 370/338, 370/254, 351, 331–334, 401, 400
    See application file for complete search history.

(56) References Cited

U.S. PATENT DOCUMENTS

| 5,007,052 A | * | 4/1991 | Flammer | ............ 370/389 |
| 6,704,293 B1 | * | 3/2004 | Larsson et al. | ........ 370/255 |
| 2003/0202477 A1 | * | 10/2003 | Zhen et al. | ........... 370/248 |
| 2004/0264372 A1 | * | 12/2004 | Huang | ................. 370/230 |

* cited by examiner

*Primary Examiner*—Chirag G Shah
*Assistant Examiner*—Minh-Trang Nguyen
(74) *Attorney, Agent, or Firm*—Sughrue Mion, PLLC

(57) ABSTRACT

A method for flooding a route request packet that is received at a node in a communication system constructed of at least three nodes including a source node that requests to establish a route and a destination node that receives the route request. One of a plurality of levels having different transmission periods is determined using a strength of a received signal of a measured packet. A transmission start point is selected at the determined level, and it is determined whether a route request packet is re-received before the selected transmission start point. The received packet is broadcast at the selected transmission start point when the packet is not re-received. The transmission start point is randomly selected within the transmission period or at the level in consideration of the number of the connected nodes.

13 Claims, 5 Drawing Sheets

FLOODING METHOD IN AD-HOC NETWORK

CROSS-REFERENCE TO RELATED APPLICATIONS

This application claims the benefit under 35 U.S.C. § 119 (a) from Korean Patent Application No. 2004-68838 filed on Aug. 31, 2004 in the Korean Intellectual Property Office, the entire disclosure of which is incorporated herein by reference.

BACKGROUND OF THE INVENTION

1. Field of the Invention

The present invention relates generally to an ad-hoc sensor network including a plurality of nodes. More particularly, the present invention relates to a method for flooding a packet from a source node to a destination node.

2. Description of the Related Art

A general mobile communication system delivers data between a mobile element and a base station. The mobile element transceives data directly with the base station without passing through other mobile elements or nodes. Meanwhile, an ad-hoc sensor network transmits a packet from a source node to a destination node via other nodes. The following is an explanation of how a node in the ad-hoc sensor network floods a packet to establish a routing path.

FIG. 1 depicts a structure of a general ad-hoc network. The ad-hoc network is constructed of a plurality of nodes including a source node and a destination node. The source node requests the setting of a route to transmit data to the destination node. Typically, the nodes in the ad-hoc network are mobile. Hence, packet flooding is required to set the route in the ad-hoc network. Hereinafter, it will be described how to flood the packet to the destination node by the source node.

The source node, which requests to set the route, generates a route request packet. The route request packet contains an address of the source node and that of the destination node. Other nodes in the ad-hoc network determine if they are the destination node based on the destination address contained in the received packet.

The source node broadcasts the generated packet. The broadcast packet from the source node reaches one-hop nodes. In FIG. 1, the one-hop nodes from the source node are nodes 1 through 5. The nodes 1 to 5 compare the destination address contained in the received packet with their addresses. If the destination address and their addresses do not match, nodes 1 through 5 update and broadcast the received packet.

The broadcast packet from the nodes 1 through 5 arrives at one-hop nodes located from the nodes 1 through 5. Specifically, the packet from the node 1 reaches the node 6 and the node 7, and the packet from the node 2 reaches the destination node and the node 8. The packet from the node 3 reaches the node 9 and the node 10, and the packet from the node 4 reaches the node 11 and the node 12. The packet from the node 5 reaches the node 13 and the node 14. The nodes 6 through 14 and the destination node receive the packet from the single node as shown in FIG. 1. However, the nodes 6 through 14 and the destination node can receive any packet from their one-hop nodes. That is, the nodes 6 through 14 and the destination node can receive at least two packets.

The nodes 6 through 14 compare the destination address contained in the received packet with their addresses. As the destination address and their addresses do not match, the nodes 6 through 14 broadcast the received packet. The destination node recognizes that the destination address of the received packet and its address match. Therefore, the routing path can be set from the source node to the destination node. As shown in FIG. 1, all the nodes in the ad-hoc network participate in the blind flooding method. As a result, other nodes excluding the nodes substantially required for the route setup are induced to participate in the blind flooding, and the participating nodes consume power.

FIG. 2 depicts another example of the packet flooding from a source node to a destination node (not shown). Table 1 shows the relationship of nodes in the ad-hoc network. Especially, Table 1 shows the number of nodes connected to the respective nodes.

TABLE 1

| Node | Number of connected nodes |
|---|---|
| Source node | 5 |
| Node 1 | 3 |
| Node 2 | 6 |
| Node 3 | 2 |
| Node 4 | 4 |
| Node 5 | 2 |
| Node 6 | 1 |
| Node 7 | 2 |
| Node 8 | 1 |
| Node 9 | 1 |
| Node 10 | 1 |
| Node 11 | 1 |
| Node 12 | 1 |
| ... | ... |

The nodes in the ad-hoc network know their one-hop nodes and information of Table 1. The following explains how the source node floods the packet to the destination node (not shown).

The source node acquires its one-hop nodes and the number of nodes connected to each one-hop node. The one-hop nodes from the source node are nodes 1 through 5. The source node chooses a node having the maximum number of connected nodes among the one-hop nodes based on Table 1. That is, the source node selects the node 2. The source node unicasts a packet to the selected node 2. The node 2 repeats the same operation as the source node, and thus sets a route from the source node to the destination node.

The packet is transferred to the node having the maximum number of the connected nodes among the one-hop nodes because of the higher probability that the packet is delivered to the destination node, as compared with the node having a relatively smaller number of the connected nodes. Note that the nodes in the ad-hoc network should store the information of Table 1 according to the packet flooding method as shown in FIG. 2. In addition, the nodes in the ad-hoc network, which are movable, have to update the information of Table 1 at predetermined time intervals. To update the information of Table 1, the nodes in the ad-hoc network need to check the one-hop nodes at predetermined time intervals, which causes power consumption.

Alternatively, the nodes in the ad-hoc network can recognize only the relationship between nodes located within a certain hop. This method is advantageous in that the nodes only need to recognize the information in part among the information organized in Table 1. However, it is required to update the node relationships at predetermined time intervals.

SUMMARY OF THE INVENTION

The present invention has been provided to address the above-mentioned and other problems and disadvantages occurring in the conventional arrangement, and an aspect of the present invention provides a method for establishing a route from a source node to a destination node by using a minimum power consumption.

Another aspect of the present invention provides a method for minimizing a time taken to establish a route from the source node to a destination node.

Yet another aspect of the present invention provides a method for minimizing the number of nodes participating in the route establishment from a source node to a destination node.

To accomplish the above aspects and/or features of the present invention, a method for flooding a route request packet that is received at a node in a communication system constructed of at least three nodes including a source node that requests to establish a route and a destination node that receives the route request, includes determining one of a plurality of levels having different transmission periods using a strength of a received signal of a measured packet; selecting a transmission start point at the determined level and determining whether a route request packet is re-received before the selected transmission start point; and broadcasting the received packet at the selected transmission start point when the packet is not re-received.

In accordance with the above aspects of the present invention, a method for selecting a transmission start point to flood a route request packet received at a node in a communication system constructed of at least three nodes including a source node that requests to establish a route and a destination node that receives the route request, includes determining one of a plurality of levels having different transmission periods using a strength of a received signal of a measured packet; and selecting a transmission start point at the determined level based on a number of connected nodes.

BRIEF DESCRIPTION OF THE DRAWING FIGURES

These and/or other aspects and advantages of the invention will become apparent and more readily appreciated from the following description of exemplary embodiments, taken in conjunction with the accompanying drawing figures of which:

DETAILED DESCRIPTION OF THE EMBODIMENTS

Figure 1:
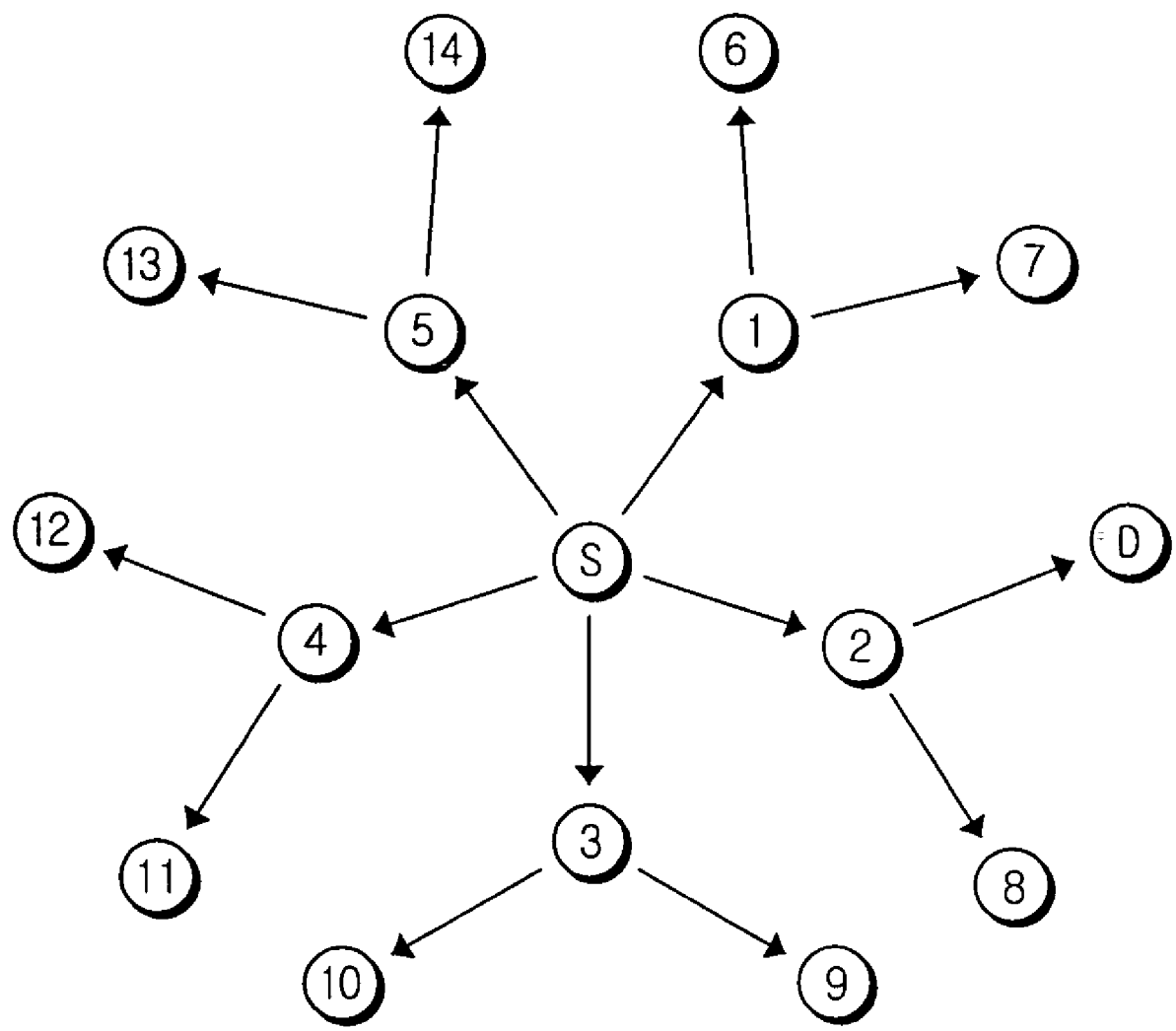
FIG. 1 depicts a blind flooding in an ad-hoc network.
Figure 2:
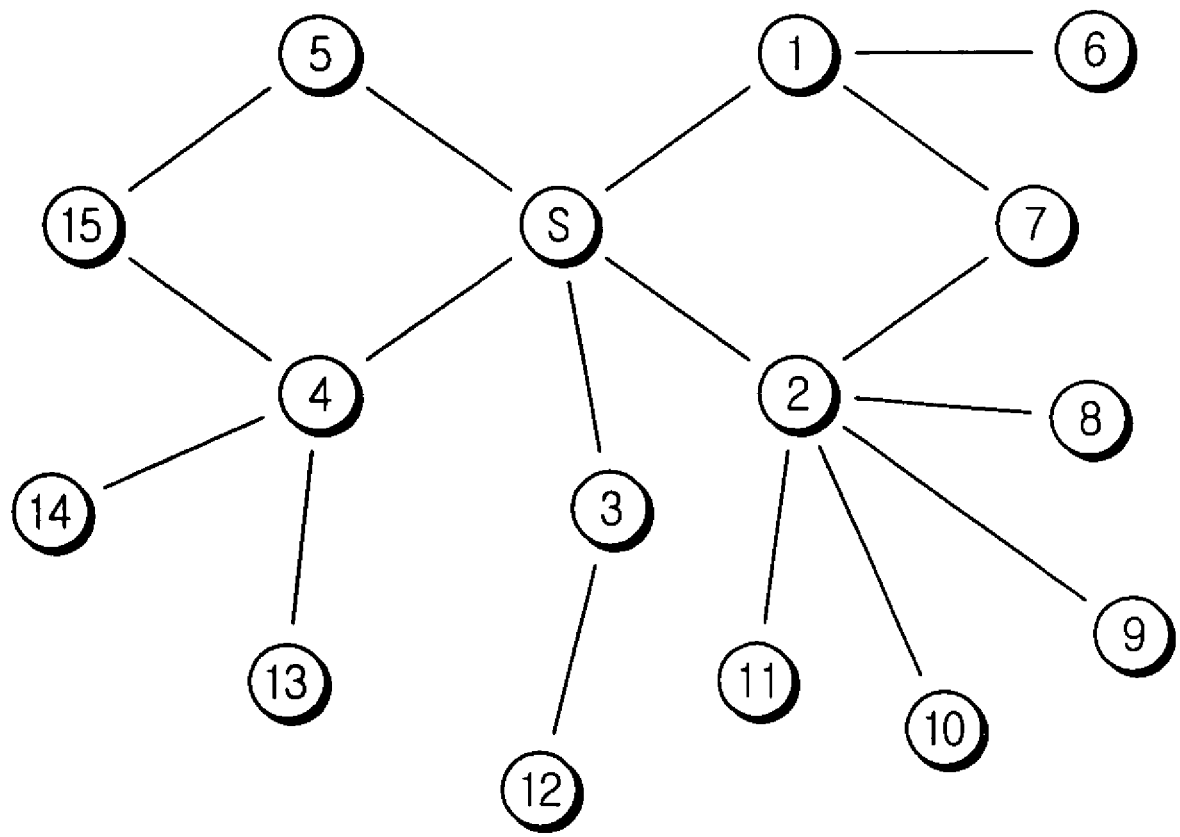
FIG. 2 depicts a selective flooding in an ad-hoc network.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
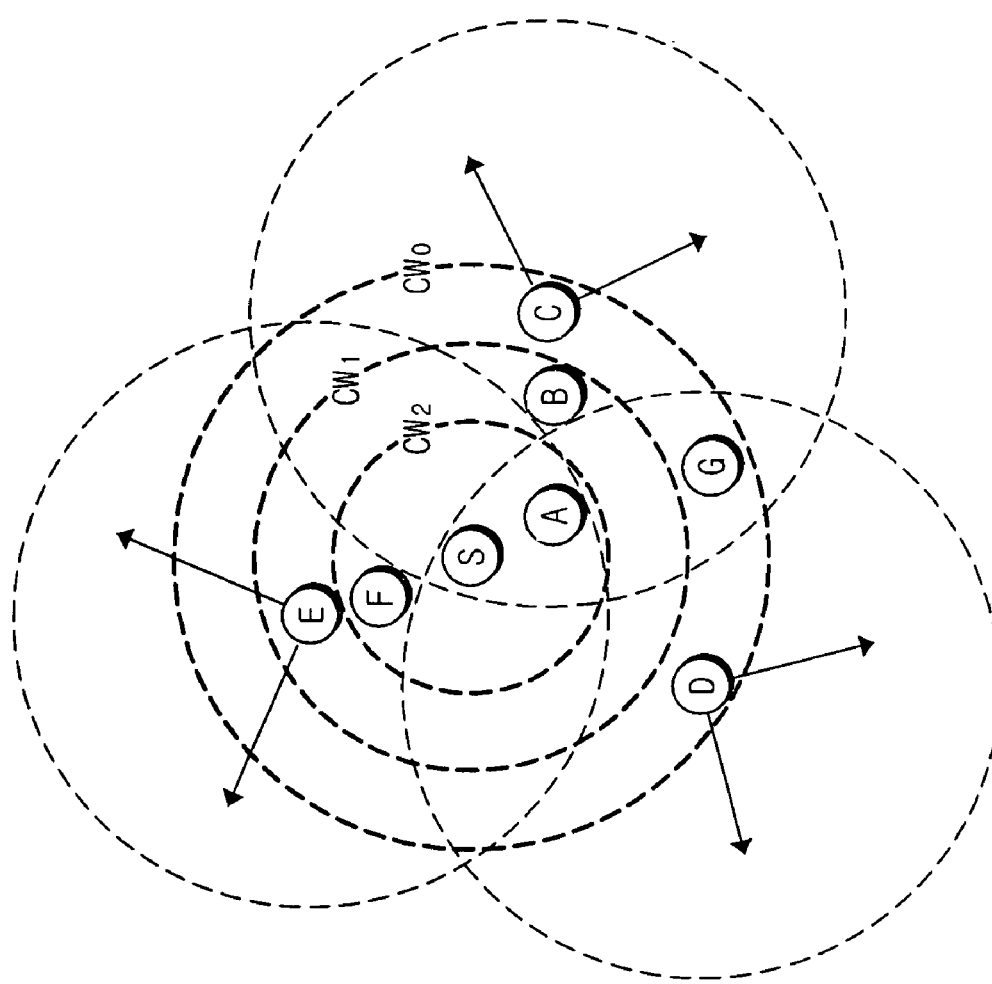
FIG. 3 depicts a flooding by nodes in an ad-hoc network according to an embodiment of the present invention.

FIG. 3 depicts packet flooding from a source node to a destination node according to an embodiment of the present invention. Especially, FIG. 3 focuses on nodes that receive a broadcast packet from the source node. Note that other nodes in an ad-hoc network also perform the same operation as the nodes illustrated in FIG. 3.

The source node generates a packet to request a route establishment to the destination node. The source node broadcasts the generated packet to its one-hop nodes. Table 2 shows one-hop nodes of each node in FIG. 3.

TABLE 2

| Node | One-hop node(s) |
|---|---|
| Source node | node A, node B |
| Node A | ... |
| Node B | ... |
| Node C | source node, node A, node B, node G |
| Node D | source node, node A, node G |
| Node E | source node, node A, node B, node F |
| Node F | ... |
| Node G | ... |

Although Table 2 shows only the one-hop nodes of the source node, a node C, a node D, and a node E, one-hop nodes of other nodes can be presented.

The broadcast packet from the source node reaches the node A through the node G. The node A through the node G obtain a received signal strength indicator (RSSI) of the received packet. The RSSI can be obtained by measuring the signal strength of the received packet. Typically, nodes in the ad-hoc network broadcast a packet with a specific strength of power. The signal strength of the received packet is inversely proportional to a distance between nodes that transmit and receive the packet. In other words, the farther the distance between the packet-transmitting (broadcasting) node and the packet-receiving node, the lower signal strength of the received packet.

The nodes in the ad-hoc network store a table as shown in Table 3.

TABLE 3

| 0(CW0) | Pr $\leq$ -87 |
|---|---|
| 1(CW1) | -87 < Pr $\leq$ -82 |
| 2(CW2) | -82 < Pr $\leq$ -77 |
| 3(CW3) | -77 < Pr $\leq$ -72 |
| ... | ... |
| k(CWk) | -57 < Pr |

Pr represents the signal strength of the received packet. The node receiving the packet determines a level of the signal strength using the measured signal strength and Table 3. For example, suppose that the node A and the node F select CW2, the node B and the node E select CW1, and the nodes C, D, and G select CW0.

The nodes in the ad-hoc network may broadcast the packet with the same transmitting power, or they may broadcast the packet with different powers. In the latter case, the broadcast packet contains information relating to the transmitting power. The level is determined based on the ratio of the transmitting power and a receiving power. Note that the nodes can acquire information relating to the level corresponding to the ratio of the transmitting power and the receiving power.

Figure 4:
FIG. 4 depicts windows by levels according to an embodiment of the present invention.

The following is an explanation of an operation at the node that receives the packet. The node upon receiving the packet broadcasts the packet in a window that is set by levels. FIG. 4 depicts windows by levels.

In FIG. 4, the window at the level of the low RSSI temporally precedes the window at the level of the high RSSI. The windows are arranged in the order of CW0, CW1, CW2, . . .

, CWk. The window size at each level can be set to be uniform, but may vary according to a user's setting. For example, the user may set the window size at the level of the lower RSSI to be smaller than the window size at the level of the higher RSSI.

The nodes C, D, and G receiving the packet broadcast the updated packet between CW0,min and CW0,max. Generally, the node updates in part information of the received packet and broadcasts the updated packet. Not all of the nodes C, D, and G but a part of the nodes broadcast the updated packet. Hence, the number of the nodes flooding the packet can be reduced, and it is possible to decrease the power consumed by the nodes in the ad-hoc network. Hereinafter, the description is made on how to determine a node which broadcasts the updated packet.

The node C randomly selects a transmission start point between CW0,min and CW0,max. The node C determines whether the same packet (including the updated packet) as the packet received before the selected transmission start point is received. When it is determined that the same packet as the received packet before the selected transmission start point is not received, the node C broadcasts the updated packet. Otherwise, when the same packet as the received packet before the selected transmission start point is received, the node C drops the received packet from the source node and the packet received before the selected transmission start point. The node D and the node G perform the same operation as the node C.

The following provides the operation of the nodes in relation to the transmission start points selected by the nodes C, D and G.

Suppose that the transmission start points randomly selected by the node C, the node D, and the node G lie in CW0,min through CW0,max in sequence. Specifically, it is given that the transmission start point of the node C is a point A, the transmission start point of the node D is a point B, and the transmission start point of the node G is a point C. The point B follows the point A and precedes the point C.

The node C does not receive the same packet (including the updated packet) as the packet that is received from the source node before the point A. Thus, the node C broadcasts the updated packet to its one-hop nodes at the point A. The one-hop nodes from the node C are shown in Table 2. The node D does not receive the same packet as the packet that is received from the source node before the point B, and thus broadcasts the updated packet to its one-hop nodes at the point B. The one-hop nodes of the node D are shown in Table 2.

In contrast, the node G receives from the node C and the node D the same packet as the packet that is received from the source node before the point C. Accordingly, the node G drops the packets received from the source node, the node C, and the node D. After the nodes in CW0 complete their operations, the nodes in CW1 carry out their operation. Hereinafter, the operation of the nodes that selected CW1 is described.

As mentioned above, the node B and the node E select CW1. The node B and the node E broadcast the updated packet in the period CW1,min through CW1,max. Not all but a part of the node B and the node E broadcasts the updated packet. Hereinafter, it is assumed that a transmission start point selected by the node B precedes a transmission start point of the node E.

The node B randomly selects a transmission start point within the period CW1,min through CW1,max. The node B determines whether the same packet (including the updated packet) as a packet that is received before the selected transmission start point, is received. Based on the determination, the node B recognizes the reception of the broadcast packet from the node C. The node B drops the packets received from the source node and the node C.

The node E determines whether the same packet (including the updated packet) as the packet that is received from the source node before its selected transmission start point, is received. Based on the determination, the node E does not receive the same packet as the packet that is received from the source node before the selected transmission start point. Thus, the node E broadcasts the updated packet to its one-hop nodes at the selected transmission start point. One-hop nodes of the node C are shown in Table 2. After the nodes that selected CW1 complete their operations, the nodes that selected CW2 perform their operations, which are explained below.

As aforementioned, the node A and the node F select CW2. The node A and the node F broadcast the updated packet in the period CW2,min through CW2,max. Likewise, not all but a part of the node A and the node F broadcasts the updated packet. Hereinafter, it is assumed that the transmission start point of the node A precedes that of the node F.

The node A randomly selects a transmission start point within the period CW2,min through CW2,max. The node A determines whether the same packet (including the updated packet) as a packet that is received before the selected transmission start point, is received. Based on the determination, the node A recognizes the reception of the broadcast packets from the node C, the node D, and the node E. The node A drops packets received from the source node, the node C, the node D, and the node E.

The node F determines whether the same packet (including the updated packet) as a packet that is received from the source node before its selected transmission start point, is received. According to the determination, the node F recognizes the reception of the broadcast packet from the node E. The node F drops packets received from the source node and the node E.

The operation of the nodes receiving the broadcast packet from the source node has been described. The nodes that receive the broadcast packet from the node C, the node D, and the node F operate the same as the node A and the node F. A difference lies in that it is determined whether the same packet as the packet received from the source node is received in reference to FIG. 3. However, the node that receives the packet from the node A through the node F determines whether a packet containing the same information is received. The packet containing the same information is a route request packet that contains the same source address and the same destination address. Note that the node A through the node F in FIG. 3 determine whether the packet is the same or a different packet by comparing the source address and the destination address contained in the route request packet.

The method for randomly selecting the transmission start point of each node has been illustrated in reference to FIG. 3, but the invention is not limited to this method. Alternatively, the transmission start point can be selected according to other methods.

The nodes at the same level determine their transmission start points using the number of their connected nodes. Suppose that the number of the connected nodes is R, the transmission start point of the node is defined in accordance with Equation 1.

$$\text{transmission point} = \frac{d}{R} \qquad \text{[Equation 1]}$$

where d is an arbitrary positive constant. Based on Equation 1, as the number of the connected nodes at the same level increases, the transmission start point of the updated packet advances For example, let the number of connected nodes of the node C be 3 and the number of connected nodes of the node G be 4. Then, the transmission start point of the node G relatively precedes that of the node C. In this manner, priority can be given to a node having the greatest number of connected nodes. Since only the number of the connected nodes is required, each node can avoid unnecessary consumption of power.

In addition to the above method, the transmission start point may be selected randomly within the transmission start point obtained in accordance with Equation 1. Specifically, the transmission start point may be randomly selected within a period of CWK,min through $$CW_{K,\min} + \frac{d}{R}.$$

The latter method provides the same effect as the former method.

Figure 5:
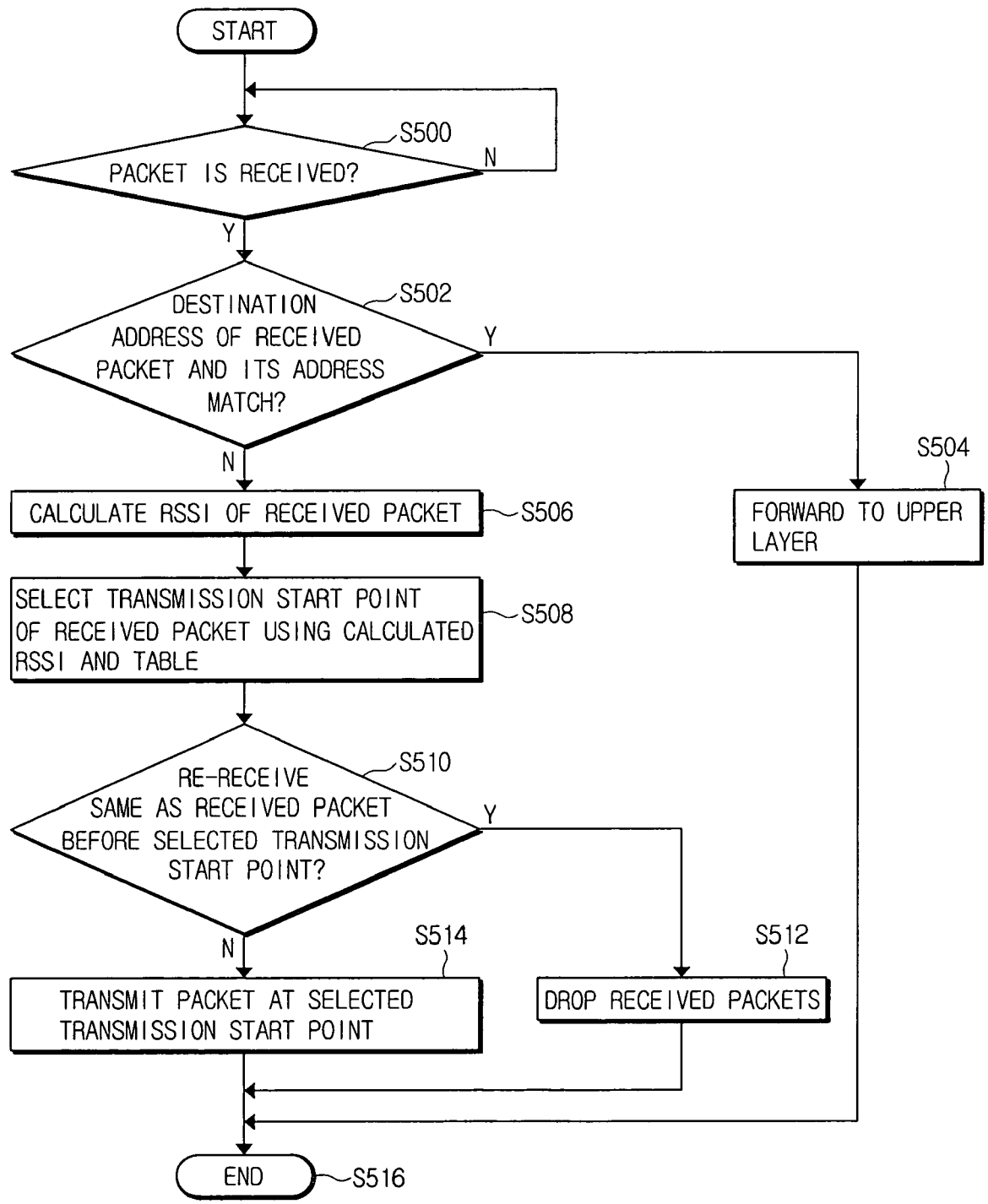
FIG. 5 is a flowchart explaining how a node floods a packet node in the ad-hoc network according to an embodiment of the present invention.

An operation of the node in the ah-hoc network is described with reference to FIG. 5. Particularly, FIG. 5 explains an operation of a node other than the source node.

The node determines whether the packet is received (S500). If the packet is received, the node proceeds to operation S502, or if the packet is not received, the node repeats operation S500 to determine the packet reception. Note that operation S500 is limited to the packet reception relating to the route establishment.

The node compares the destination address of the received packet with its own address (S502). If the destination address and its address match, the node proceeds to operation S504. The node recognizes that it is the destination node of the received packet and forwards the received packet to its upper layer for further processing (S504). As a result, the route can be established from the source node to the destination node.

If the destination address is different from the address of the node, the node proceeds to operation S506. The node measures the power strength of the received packet and calculates the RSSI (S506). The node may measure a signal-to-noise ratio instead of the strength of the receiving power.

The node determines the transmission start point of the received packet using the calculated RSSI and the table (S508). The node selects the transmission start point of the received packet based on Table 3 and FIG. 4, or Equation 1. The selection of the transmission start point is not further illustrated for brevity.

The node determines whether a same packet as the packet (the updated packet) received at operation S500 is received before the selected transmission start point (S510). If the same packet has been received, the node proceeds to operation S512. If the same packet has not been received, the node proceeds to operation S514.

The node drops the received packets (S512). In detail, the node drops the packet received at operation S500 and the packet received before the transmission start point. The node updates the packet that is received at operation S500, and broadcasts the updated packet at the transmission start point selected at operation S508 (S514). The node finishes its operation (S516).

As set forth above, the present invention can reduce the power consumption at each node by minimizing the number of nodes participating in the route establishment from the source node to the destination node. The transmission start point of the packet is selected using the number of nodes connected to the corresponding node. Therefore, the amount of the delivered information can be reduced, and the probability of collisions between at least two packets can be decreased, as comparing with the conventional selective flooding.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method for flooding a route request packet that is received at a first node in a communication system constructed of at least three nodes including a source node that requests to establish a route and a destination node that receives the route request, the method comprising:
   determining one of a plurality of levels of signal strength having different transmission periods using a strength of a received signal of a measured packet;
   selecting a transmission start point at the determined level and determining whether a route request packet is re-received before the selected transmission start point; and
   broadcasting the received packet at the selected transmission start point when the packet is not re-received.

2. The method according to claim 1, wherein whether the route request packet is re-received is determined by comparing a source address and a destination address.

3. The method according to claim 2, wherein the signal strength of the received packet is measured only when a destination address in the received packet is different from an address of the node.

4. The method according to claim 2, wherein a received packet is dropped if the received packet is the re-received route request packet.

5. The method according to claim 1, wherein the first node stores information relating to the strength of the received signal by levels.

6. The method according to claim 5, wherein a low signal strength has a relatively earlier transmission start point than a high signal strength.

7. The method according to claim 6, wherein transmission periods at each of the levels are defined to a uniform size.

8. The method according to claim 1, wherein the transmission periods at each of the levels do not overlap with each other.

9. A method for selecting a transmission start point to flood a route request packet received at a node in a communication system constructed of at least three nodes including a source node that requests to establish a route and a destination node that receives the route request, the method comprising:
   determining one of a plurality of levels of signal strength having different transmission periods using a strength of a received signal of a measured packet;
   selecting a transmission start point at the determined level based on a number of connected nodes;
   wherein the selection of the transmission start point comprises:

re-setting a transmittable period within a transmission period in accordance with the number of the connected nodes; and randomly selecting a transmission start point within the re-set transmittable period.

10. The method according to claim 9, wherein the node having a greater number of connected nodes selects an earlier transmission start point.

11. The method according to claim 9, wherein a start point of the transmittable period is the same as a start point of the transmission period, and an end point of the transmittable period is determined based on the number of the connected nodes.

12. The method according to claim 11, wherein a greater number of the connected nodes indicates a shorter transmittable period.

13. A method for selecting a transmission start point to flood a route request packet received at a node in a communication system constructed of at least three nodes including a source node that requests to establish a route and a destination node that receives the route request, the method comprising:

determining one of a plurality of levels having different transmission periods using a strength of a received signal of a measured packet; and selecting a transmission start point at the determined level based on a number of connected nodes, wherein the selection of the transmission start point comprises re-setting a transmittable period within a transmission period in accordance with the number of the connected nodes; and randomly selecting a transmission start point within the re-set transmittable period, wherein a start point of the transmittable period is the same as a start point of the transmission period, and an end point of the transmittable period is determined based on the number of the connected nodes, wherein a greater number of the connected nodes indicates a shorter transmittable period, and wherein the transmittable period is determined between $CW_{K,min}$ and $$CW_{k,min} + \frac{d}{R},$$

wherein $CW_{K,min}$ is a start point of a K-th transmission period, d is an arbitrary positive constant, and R is the number of the connected nodes.

* * * * *